(12) United States Patent
Knee et al.

(10) Patent No.: US 7,634,786 B2
(45) Date of Patent: Dec. 15, 2009

(54) INTERACTIVE TELEVISION PROGRAM GUIDE SYSTEM FOR DETERMINING USER VALUES FOR DEMOGRAPHIC CATEGORIES

(75) Inventors: Robert A Knee, Lansdale, PA (US); Steven J Reynolds, Littleton, CO (US); Michael D Ellis, Boulder, CO (US); Joel G Hassell, Arvada, CO (US)

(73) Assignee: United Video Properties, Inc., Tulsa, OK (US)

( * ) Notice: Subject to any disclaimer, the term of this patent is extended or adjusted under 35 U.S.C. 154(b) by 626 days.

(21) Appl. No.: 10/923,263

(22) Filed: Aug. 20, 2004

(65) Prior Publication Data

US 2005/0155056 A1    Jul. 14, 2005

Related U.S. Application Data

(63) Continuation of application No. 09/139,777, filed on Aug. 25, 1998, now abandoned.

(60) Provisional application No. 60/085,750, filed on May 15, 1998.

(51) Int. Cl.
*H04N 7/025* (2006.01)
*H04N 7/10* (2006.01)

(52) U.S. Cl. .......................... 725/35; 725/34

(58) Field of Classification Search ................ 725/34, 725/35
See application file for complete search history.

(56) References Cited

U.S. PATENT DOCUMENTS

| | | | | |
|---|---|---|---|---|
| 4,694,490 A | | 9/1987 | Harvey et al. | |
| 5,155,591 A | * | 10/1992 | Wachob | 725/35 |
| 5,260,778 A | * | 11/1993 | Kauffman et al. | 725/33 |
| 5,335,277 A | * | 8/1994 | Harvey et al. | 380/242 |
| 5,410,344 A | * | 4/1995 | Graves et al. | 725/46 |
| 5,446,919 A | | 8/1995 | Wilkins | |
| 5,485,197 A | | 1/1996 | Hoarty | |
| 5,515,098 A | * | 5/1996 | Carles | 725/35 |
| 5,559,548 A | * | 9/1996 | Davis et al. | 725/40 |
| 5,559,549 A | * | 9/1996 | Hendricks et al. | 725/50 |
| 5,579,055 A | * | 11/1996 | Hamilton et al. | 725/49 |
| 5,585,866 A | * | 12/1996 | Miller et al. | 725/43 |
| 5,589,892 A | * | 12/1996 | Knee et al. | 725/43 |

(Continued)

FOREIGN PATENT DOCUMENTS

DE     3909334 C3     3/1989

(Continued)

*Primary Examiner*—Christopher Kelley
*Assistant Examiner*—Mulugeta Mengesha
(74) *Attorney, Agent, or Firm*—Ropes & Gray, LLP

(57) ABSTRACT

An interactive television program guide system for determining user input values for demographic categories is provided. The system includes user television equipment having a receiver for receiving program guide information for the interactive television program guide, a user input receiver for receiving user input from user interface, a microprocessor which utilizes the user input received to determine user values for demographic categories, and memory for storing the user values determined. In one illustrative use of the system for targeting advertisements the receiver also receives advertisements, where the advertisements have preselected values for specified demographic categories. The user television equipment, preferably using a microprocessor, compares the preselected values for the specified demographic categories associated with the advertisements with values of corresponding demographic categories stored in memory to determine which advertisements should be displayed.

22 Claims, 5 Drawing Sheets

U.S. PATENT DOCUMENTS

| | | | |
|---|---|---|---|
| 5,600,364 A * | 2/1997 | Hendricks et al. | 725/9 |
| 5,600,573 A * | 2/1997 | Hendricks et al. | 725/109 |
| 5,635,978 A * | 6/1997 | Alten et al. | 725/42 |
| 5,659,350 A | 8/1997 | Hendricks et al. | |
| 5,682,195 A | 10/1997 | Hendricks et al. | |
| 5,734,853 A | 3/1998 | Hendricks et al. | |
| 5,740,549 A * | 4/1998 | Reilly et al. | 705/14 |
| 5,758,257 A * | 5/1998 | Herz et al. | 725/116 |
| 5,760,821 A * | 6/1998 | Ellis et al. | 725/50 |
| 5,801,747 A * | 9/1998 | Bedard | 725/46 |
| 5,805,154 A | 9/1998 | Brown | |
| 5,819,156 A | 10/1998 | Belmont | |
| 5,830,068 A * | 11/1998 | Brenner et al. | 463/42 |
| 5,838,314 A | 11/1998 | Neel et al. | |
| 5,940,073 A * | 8/1999 | Klosterman et al. | 715/721 |
| 6,002,393 A * | 12/1999 | Hite et al. | 715/719 |
| 6,160,570 A * | 12/2000 | Sitnik | 725/9 |
| 6,177,931 B1 * | 1/2001 | Alexander et al. | 725/52 |
| 6,286,140 B1 | 9/2001 | Ivanyi | |
| 6,614,987 B1 * | 9/2003 | Ismail et al. | 386/83 |
| 6,698,020 B1 * | 2/2004 | Zigmond et al. | 725/34 |
| 2006/0212900 A1 * | 9/2006 | Ismail et al. | 725/34 |

FOREIGN PATENT DOCUMENTS

| | | |
|---|---|---|
| EP | 0424648 A2 | 5/1991 |
| EP | 0725539 | 5/1997 |
| EP | 0748405 A2 | 7/1997 |
| EP | 0784405 | 7/1997 |
| WO | WO 95/06389 A1 | 3/1995 |
| WO | WO 95/07003 | 3/1995 |
| WO | WO 95/32585 | 11/1995 |
| WO | WO 96/08109 | 3/1996 |
| WO | WO 96/08113 | 3/1996 |
| WO | WO 96/09721 | 3/1996 |
| WO | WO 96/34491 | 10/1996 |
| WO | WO 96/41471 | 12/1996 |
| WO | WO 97/17774 | 5/1997 |
| WO | WO 97/18675 | 5/1997 |
| WO | WO 97/31480 | 8/1997 |
| WO | WO 97/42763 | 12/1997 |
| WO | WO 97/48230 | 12/1997 |
| WO | WO 97/49242 | 12/1997 |
| WO | WO 9749237 | 12/1997 |
| WO | WO 98/06219 | 2/1998 |
| WO | WO 98/28906 | 7/1998 |

* cited by examiner

| DEMOGRAPHIC CATEGORIES | VALUE | PRESELECTED VALUE ADVERTISEMENT 1 | PRESELECTED VALUE ADVERTISEMENT 2 |
|---|---|---|---|
| ① SPORTS FAN | 1 | 0.5 | 0.7 |
| ② SCIENCE FICTION FAN | 0.7 | | |
| ③ PARENT | 0 | | |
| ④ DOG-LOVER | 0.5 | | |
| ⑤ CAT-LOVER | 0.7 | | |
| ⑥ ANNUAL INCOME OVER $20,000 | 1 | | |
| ⑦ ANNUAL INCOME OVER $30,000 | 0 | 1 | |
| ⑧ ANNUAL INCOME OVER $50,000 | 0 | | |
| ⑨ FEMALE AGE 20-30 | 0 | | |
| ⑩ MALE AGE 18-40 | 1 | | 1 |

FIG. 2

| USER INPUT | WEIGHT VALUE |
| --- | --- |
| ① RECORD PROGRAM | 1.0 |
| ② SET REMINDER | 0.5 |
| ③ TUNE/WATCH MINIMUM 5 MINUTES | 0.5 |
| ④ RETRIEVE INFORMATION | 0.25 |

FIG. 3

DEMOGRAPHIC CATEGORIES

| CHANNEL | SPORTS FAN | | SCIENCE FICTION FAN | | ... |
|---|---|---|---|---|---|
| | PRESELECTED VALUE(PV) | WEIGHT FACTOR(WF) | PRESELECTED VALUE(PV) | WEIGHT FACTOR(WF) | |
| ESPN | 0.95 | 2 | 0.6 | 1.5 | |
| CHANNEL XYZ | 0.5 | 1 | 0.8 | 1.8 | |
| ⋮ | | | | | |

FIG. 4

INTERACTIVE TELEVISION PROGRAM GUIDE SYSTEM FOR DETERMINING USER VALUES FOR DEMOGRAPHIC CATEGORIES

This application is a continuation of U.S. patent application Ser. No. 09/139,777, filed Aug. 25, 1998, now abandoned which claims the benefit of U.S. provisional application No. 60/085,750, filed May 15, 1998, the disclosures of which are incorporated herein by reference in their entireties.

BACKGROUND OF THE INVENTION

This invention relates to interactive television program guides, and more particularly, to an interactive television program guide system for determining user values for demographic categories such that the determined values can be utilized for specified uses, such as for targeting advertisements.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listings by theme (e.g., movies, sports, etc.) or by title (i.e, alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

The user's interactions with the program guide are indicative of the user's interests. For example, if the user purchases a pay-per-view movie, making that purchase shows that the user is interested in movies of that type. Searching for program listings in the category "sports" indicates that the user is interested in sports. Although the user's interactions with the program guide indicate the user's interests, previously known program guide systems did not monitor or use this information.

In commonly-assigned co-pending U.S. patent application Ser. No. 09/034,939, filed Mar. 4, 1998, which is incorporated herein by reference in its entirety, there is described a program guide system for determining a user's interests by monitoring the user's interactions with the program guide. The '939 application also describes utilizing the user's interests to present advertisements or to take actions in the program guide.

It would be desirable to be able to provide a systematic approach for categorizing user information into demographic categories that could then be used for specified purposes, such as for targeting advertisements or taking certain actions in the program guide. As used throughout in the present application, "demographic categories" means categories of user information, such as income, age, hobbies, etc., which serve as a basis for identification and selection. Advantages that would be offered by such a systematic approach include greater effectiveness and less cost in achieving a specified purpose. For example, to target advertisements, the use of demographic categories means more effective targeting of advertisements and consequently lower costs. Advertisers could select demographic categories to ensure that the advertisements target only those users who would most likely be interested in the products or services they offer.

It is therefore an object of the present invention to provide a program guide system which categorizes information obtained from a user's interaction with the program guide into demographic categories. Another object of the invention is to determine user values for the demographic categories. Still another object of the invention is to provide an interactive television program guide system which determines user values for the demographic categories such that advertisers can select specific demographic categories of significance to ensure that the products or services they offer will be targeted to those users who will most likely be interested in purchasing the products or services.

SUMMARY OF THE INVENTION

This and other objects of the invention are accomplished in accordance with the principles of the present invention by an interactive television program guide system for determining user input values for demographic categories. The system includes user television equipment having a receiver for receiving program guide information for the interactive television program guide, a user input receiver for receiving user input from user interface, such as a remote control, a microprocessor which utilizes the user input received to determine user values for demographic categories, and memory for storing the user values determined.

In one illustrative use of the system for targeting advertisements to a user of the interactive television program guide, the receiver also receives advertisements, where the advertisements have preselected values for specified demographic categories. The user television equipment, preferably using microprocessor, compares the preselected values for the specified demographic categories associated with the advertisements with values of corresponding demographic categories stored in memory to determine which advertisements should be displayed. Those advertisements determined to be displayable based upon the comparison are then displayed.

Further features of the invention, its nature and various advantages will be more apparent from the accompanying drawings and the following detailed description of the preferred embodiments.

BRIEF DESCRIPTION OF THE DRAWINGS

FIG. 2 is a list of ten exemplary demographic categories and their values, as well as preselected values for two advertisements received by the user television equipment of FIG. 1 in accordance with the present invention.

FIG. 3 is a table showing four exemplary user inputs and their predetermined weight values to be utilized by the user television equipment of FIG. 1 to determine values for demographic categories in accordance with the present invention.

FIG. 4 is a table showing exemplary demographic categories and preselected value and weight factor for each of the channels to be utilized by the user television equipment of FIG. 1 to determine values for demographic categories in accordance with the present invention.

DETAILED DESCRIPTION OF THE PREFERRED EMBODIMENTS

Figure 1:
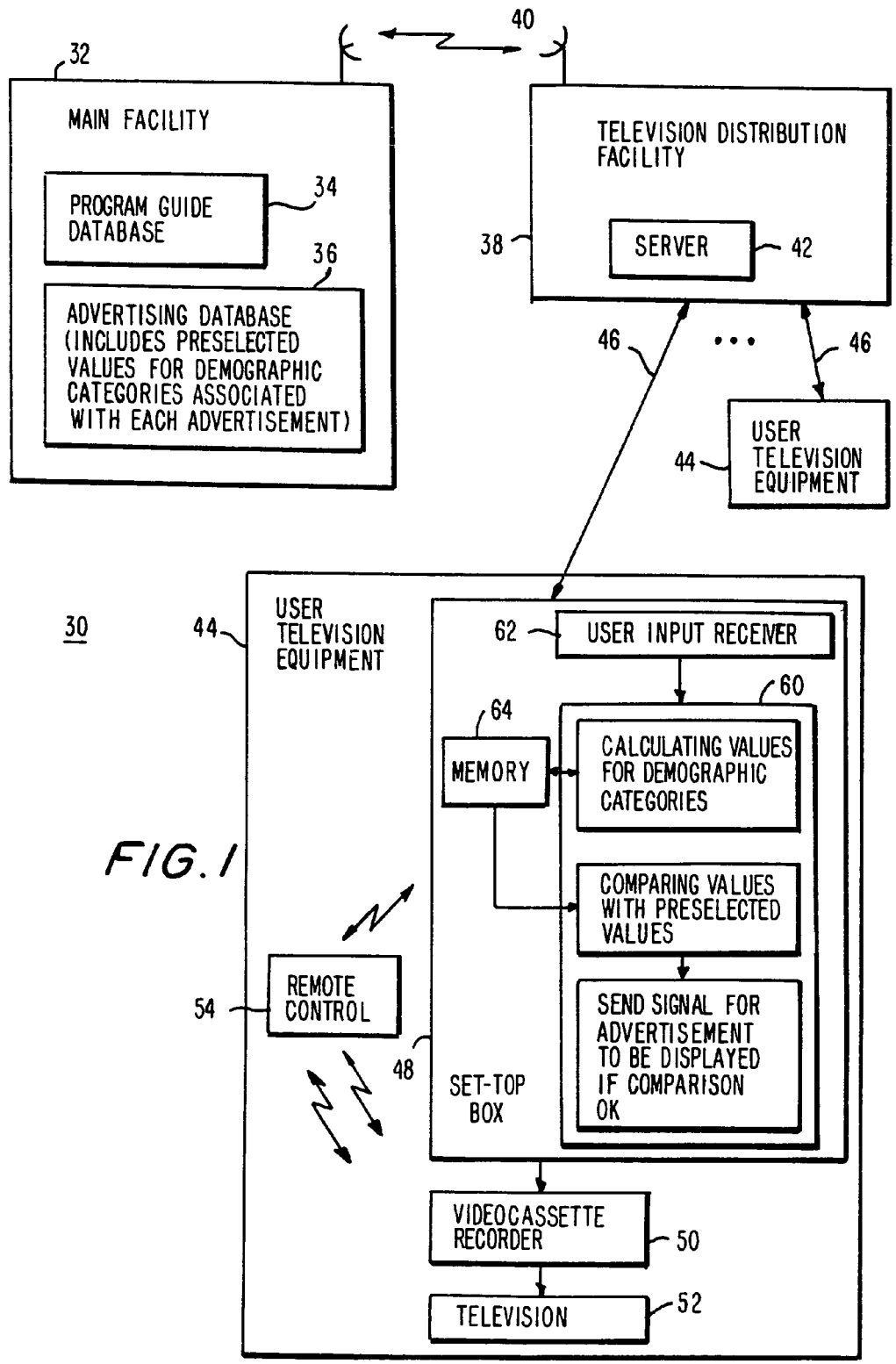
FIG. 1 is a diagram of an illustrative system for targeting advertisements to a user of an interactive television program guide in accordance with the present invention.

An illustrative program guide system 30 for use in targeting advertisements to specified users in accordance with the present invention is shown in FIG. 1. Although the specified purpose for which user demographic information is to be utilized is illustratively shown to be for targeting advertisements, it will be apparent to one skilled in the art that user demographic information may also be used for other specified purposes.

A main facility 32 includes a program guide database 34 for storing program guide information, such as television program guide listings data, pay-per-view ordering information, television program promotional information, etc. The main facility 32 also includes an advertising database 36 for storing advertising information. Information from databases 34 and 36 may be transmitted to a television distribution facility 38 via communications link 40. There are typically numerous television distribution facilities 38 to which information from main facility 32 is transmitted in parallel, although only one such television distribution facility 38 is shown in FIG. 1 to avoid over-complicating the drawings. Link 40 may be a satellite link, a telephone network link, a cable or fiber optic link, a microwave link, a combination of such links, or any other suitable communications path. If it is desired to transmit video signals (e.g., for advertising and promotional videos) over link 40 in addition to data signals, a relatively high bandwidth link such as a satellite link is generally preferable to a relatively low bandwidth link such as a telephone line.

The television distribution facility 38 is a facility for distributing television signals to users, such as a cable system headend, a broadcast distribution facility, or a satellite television distribution facility.

The program guide information transmitted by the main facility 32 to the television distribution facility 38 includes television program listings data, such as program times, channels, titles, descriptions, etc. Transmitted program information also includes pay program data, such as pricing information for individual programs and subscription channels, time windows for ordering programs and channels, telephone numbers for placing orders that cannot be impulse ordered, etc. The advertising information transmitted by the main facility 32 to the television distribution facility 38 includes text, graphics, video and/or other (e.g. audio) advertisements for various products and services. As will be described in greater detail later, the advertising information may also include preselected values for demographic categories associated with each advertisement.

If desired, some of the program guide and advertising information may be provided using data sources at facilities other than then main facility 32. For example, data related to pay program order processing (e.g., billing data and the like) may be generated by an order processing and billing system that is separate from the main facility 32 and separate from the television distribution facility 38. Similarly, advertising information may be generated by an advertising facility that is separate from the main facility 32 and the television distribution facility 38.

Regardless of its source, advertising information may be maintained on a server 42 within the television distribution facility 38, if desired. Server 42 may be capable of handling text, graphics, and video.

Television distribution facility 38 distributes program guide and advertising information to user television equipment 44 via communications paths 46. User television equipment may include a set-top box or may be an advanced television receiver or personal computer television (PC/TV), if desired. Each communications path 46 may be a satellite link, a telephone network link, a cable or fiber optic link, a microwave link, a combination of such links, or any other suitable communications path. Program guide data may be distributed over an out-of-band channel on path 46, an in-band digital channel, or any other suitable technique. Advertising information may be distributed using any of a number of suitable techniques. For example, text and graphics advertisements may be distributed over an out-of-band channel using an out-of-band modulator. Video advertisements may also be distributed in this manner, although large quantities of video information may be more efficiently distributed using one or more digital channels on path 46. Such digital channels may also be used for distributing text and graphics.

Each user has a receiver unit, which is typically a set-top box 48, but which may be other suitable television equipment into which set-top box functionality as will be described herein has been integrated. Program guide data is distributed to the set-top boxes 48 periodically. The television distribution facility 38 may also poll the set-top boxes 48 periodically for certain information (e.g., pay program account information or information regarding programs that have been purchased and viewed using locally-generated authorization techniques).

Each set-top box 48 is typically connected to an optional videocassette recorder 50 so that selected television programs may be recorded. The videocassette recorder 50 is connected to a television 52. To record a program, the set-top box 48 tunes to a particular channel and sends control signals to the videocassette recorder 50 (e.g., using an infrared transmitter) that directs the videocassette recorder 50 to start and stop recording at appropriate times.

An interactive television program guide is implemented on user television equipment 44 (e.g., on set-top box 48). During use of the interactive television program guide implemented on the set-top box 48, television program listings may be displayed on the television 52. Each set-top box 48, videocassette recorder 50, and television 52 may be controlled by one or more remote controls 54 or any other suitable user input interface, such as a wireless keyboard, mouse, trackball, dedicated set of buttons, etc.

The set-top box 48 includes a microprocessor 60, a user input receiver 62, and memory 64. Other component of the set-top box which are needed for implementing a program guide are not specifically described herein since they are not part of the present invention. The user input receiver 62 receives user input from remote control 54 or other user input interfaces. For example, if user input is to be transmitted by an infrared remote control signal, then the user input receiver would be an infrared signal receiver. As will be described in greater detail later, the microprocessor 60 utilizes the user input signals received by the user input receiver 62 to calculate values for different demographic categories.

The microprocessor 60 also compares the values of the relevant demographic categories for the user stored in memory 64 with the preselected values associated with each advertisement received by the set-top box 48 to determine whether the advertisement is to be displayed on the television 52. Memory 64, which is preferably non-volatile memory, stores values of the demographic categories for the user. Memory 64 may also store information necessary to calculate the values of the demographic categories for the user. For example, memory 64 may store information such as the likelihood that a viewer watching the ESPN channel is a fan of sports. Such information may also be stored in another memory electrically coupled to the microprocessor 60.

FIG. 2 is a sample list of the demographic categories and the values of the demographic categories for the user stored in memory 64. FIG. 2 also shows the preselected values for two advertisements received by the set-top box 48. Under the demographic categories heading, there are shown ten exemplary predefined demographic categories. These categories are: (1) sports fan, (2) science fiction fan, (3) parent, (4) dog-lover, (5) cat-lover, (6) annual income over $20,000, (7) annual income over $30,000, (8) annual income over $50,000, (9) female age range of 20-30, and (10) male age range of 18-40.

The value for each of the demographic categories is from 0 to 1. Zero indicates that the user does not fit the demographic category (or the probability that the user fits the category is zero). One indicates that the user fully fits the demographic category (or the probability that the user fits the category is one). Any value between 0 and 1 indicates that the user partially fits the demographic category, with a higher number indicating a correspondingly better fit. The selection of this range is not significant and any other range (e.g., 1-10) or representation of the demographic information (e.g., codes, tags, characters or the like) may be used to carry out the objects of the present invention. The determination of the values for the demographic categories will be described later.

For the exemplary user of FIG. 2, the values for the demographic categories indicates that the user is a male in the age group of 18-40, his annual income is over $20,000 but not over $30,000, he is an unmitigated sports fan, and he is a greater cat-lover (0.7 value) than a dog-lover (0.5 value).

Advertisement #1, which for purposes of illustration only will be assumed to be for a sports utility vehicle, has preselected values of at least 0.5 for the sports fan demographic category and 1 for the annual income over $30,000 demographic category. Note that FIG. 2 is not necessarily indicative of what a real advertiser of sports utility vehicles would select in terms of values or even demographic categories, but is suitable for purposes of illustration. The 0.5 preselected value for the sports fan category means that the advertiser desires to target advertisement #1 to someone who is at least moderately interested in sports. In addition, the advertiser desires to target someone who is at least making $30,000 a year. Since the user in the example of FIG. 2 does not fit the income category, advertisement #1 would not be displayed on the user's television 52.

Advertisement #2, which for purposes of illustration only will be assumed to be for beer, has preselected values of at least 0.7 for the sports fan demographic category and 1 for the male in the age group of 18-40 demographic category. The 0.7 preselected value for the sports fan category means that the advertiser desires to target advertisement #2 to someone who has at least fairly significant interest in sports. In addition, the advertiser desires to target someone who is a male in the age group of 18-40. Since the user in FIG. 2 fits both categories as demonstrated by the values, advertisement #2 would be displayed on the user's television 52.

The value for each demographic category is reflective of the characteristics of the user. There are many different ways to calculate or determine values for such demographic categories. Any suitable technique for generating information representing the demographic characteristics of the user may be used if desired. For example, demographic information on users may be gathered using surveys (on-line, telephone, door-to-door, mail, program-guide-based, etc.) or other type of market research. The following describes one suitable technique for calculating or determining the values for the demographic categories based on user inputs in the program guide.

User inputs received by the user input receiver 62 have predetermined weight values (WV) associated with them. In FIG. 3, there are shown four such exemplary user inputs with corresponding weight values (the selection of value range 0-1 for the weight values is not significant in and of itself): recording a program with weight value of 1.0; setting a reminder with weight value of 0.5; tuning to a program and watching for at least five minutes with weight value of 0.5; and retrieving information about a program with weight value of 0.25. The weight values are indicative of the effect the corresponding user inputs have on the values of the demographic categories. The greater the weight value of a user input, the greater the values of the demographic categories associated with such user input. Therefore, according to the example of FIG. 3, a user who records a program will have greater values for the pertinent demographic categories than she will retrieving information about the same program. This is because the act of recording a program generally indicates a greater level of interest in the program then just retrieving information for the program.

Each channel and program having a bearing on at least one of the demographic categories may have a preselected value (PV) for each demographic category associated with it. This preselected value is indicative of the channel or program's indication of how well a user fits the demographic category. For example as shown in FIG. 4, the ESPN channel may have a preselected value of 0.95 (from value range of 0-1) associated with the sports fan demographic category since there is a very strong likelihood that a viewer of ESPN is a sports fan. However, the ESPN channel may have a preselected value of 0.5 associated with the cat-lover demographic category since there likely is not a strong connection between the two. The preselected values may be determined from research, survey, poll, or any other reliable means. Again, it should be noted that the selection of value range 0-1 for the preselected values is not significant in and of itself.

There is preferably a default value assigned for each demographic category. For example, the sports fan demographic category may have a default value of 0.5. The default value may represent the value for a "typical" user and is utilized in calculating the value of the demographic category for the user as will be discussed below.

Each demographic category may have a period (P), which is the minimum number of user inputs necessary before the demographic category value is deemed to be meaningful and reflective of the user. For example, the sports fan demographic category may have a period of five.

Each channel or program having a preselected value for an associated demographic category may have a predetermined weight factor (WF). For example, the ESPN channel may have a weight factor of 2 for the sports fan demographic category as shown in FIG. 4. The weight factor represents the significance of the channel or program relative to the period for the demographic category.

For each user input involving a relevant channel or program, the value for a demographic category is as follows:

$$V_d(i) = \frac{(WV*WF*PV) + ((P - (WV*WF))*V_d(i-1))}{P}$$

$V_d(i-1)$ is the previous value for the demographic category and i represents the number of user inputs. Where i=1 (i.e., the first user input involving a relevant channel or program associated with the demographic category), the $V_d(i-1)$ used above is the default value for the demographic category. It should be noted that any other equation or function which properly reflects the user's interests based on user inputs into the system can be used to determine values for demographic categories in accordance with the present invention.

As an example, the determination of value for the sports fan demographic category given three user inputs is described. Let's assume that the three user inputs are as follows: (1) retrieve information about a sporting event on ESPN; (2) tune in and watch ESPN for at least five minutes; and (3) record a sporting event from ESPN. Using the values set forth in the examples provided above and in FIG. 3, $$V_{sports\ fan}(1) = \frac{(0.25*2*0.95) + ((5 - 0.25*2)*0.5)}{5}$$
$$= (0.475 + 2.25)/5 = 0.545$$

$$V_{sports\ fan}(2) = \frac{(0.5*2*0.95) + ((5 - 0.5*2)*0.545)}{5}$$
$$= (0.95 + 2.18)/5 = 0.626$$

$$V_{sports\ fan}(3) = \frac{(1*2*0.95) + ((5 - 1*2)*0.626)}{5}$$
$$= (1.9 + 1.878)/5 = 0.7556$$

After the three user inputs involving ESPN, the value of the sports fan demographic category is 0.7556, indicating that the user is very much a sports fan. However, because there have only been three user inputs received and the predefined period for the sports fan demographic category is five, the calculated value may not be significant enough for purposes of targeting advertisements (note that the calculated value may still be used if desired). If the calculated value is not to be used for this reason, then the default value may be used instead.

It is preferable to target advertisements to users based on current user information. Therefore, the present invention provides a decay function to "refresh" the values of the demographic categories for the user on a periodic basis, such as every seven days, or based on a specified number of user inputs.

As an example, let's assume that the value for the sports fan demographic category stored in memory 64 is 0.8 and the decay function refreshes the value for the sports fan demographic category every seven days during which no input action has been received. If it has been seven days since the last user input affecting the sports fan demographic category has been received, the decay function will refresh the value for the sports fan category to a predetermined value, such as the default value for the demographic category. The decay function may also use the formula given above for $v_d(i)$, with different values/parameters. Note that it is preferable to have the microprocessor 60 perform the decay function.

In FIG. 2, there is illustrated what may be called the threshold approach of targeting advertisements to users. That is, if the preselected value(s) of a demographic category for an advertisement is met by the value of the demographic category for the user, then the advertisement is displayed to the user by the program guide.

Another approach of targeting advertisements to users may be called the best fit or closest approach. In this approach, the "closeness" of the preselected values of the demographic categories for an advertisement is determined from the values of the demographic categories for the user. This closeness may be determined by, for example, calculating the absolute difference between the preselected value and the user value for each demographic category, and then adding all of the absolute differences. Root-mean-square may also be used. The best fit approach is particularly useful where it is desired to select the advertisement(s) to be displayed from among many advertisements transmitted to the user's set-top box.

It should be noted that the values of the demographic categories may be based on user information from an external source. For example, if the user's annual income is determined from publicly available information or from a form filled out by the user, then this information can be transmitted to the set-top box and stored in memory.

In the illustrative program guide system 30 of FIG. 1, the set-top box 48 calculates values for the demographic categories, stores the calculated values and other information necessary to calculate the values, and compares the values of the relevant demographic categories for the user with the preselected values associated with each advertisement to determine whether the advertisement is to be displayed. The program guide system of the present invention can be modified in a manner apparent to those skilled in the art reading the description herein such that any of these operations performed of the set-top box can be performed instead at the television distribution facility 38 or the main facility 32 or at any other location (not shown in FIG. 1).

Figure 5:
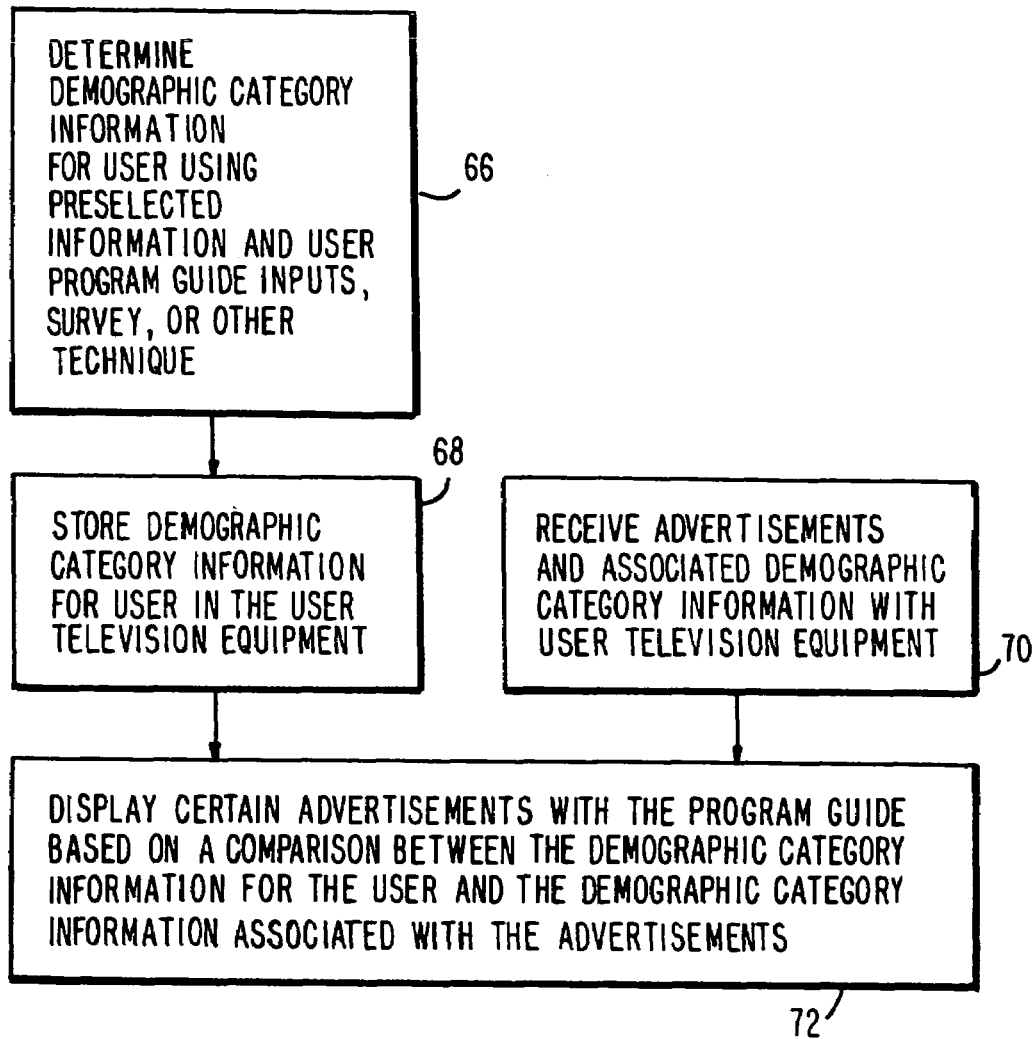
FIG. 5 is a flowchart showing steps involved in displaying advertisements based on demographic information in accordance with the present invention.

Steps involved in displaying advertisements based on demographic information are shown in FIG. 5. At step 66, demographic category information for the user is determined using a suitable technique such as a survey, or by monitoring the user's actions with the program guide and calculating the demographic category information based upon the user's actions and preselected information stored in memory. At step 68, the demographic category information that is representative of the user's demographic profile is stored in the user's television equipment 44. At step 70, advertisements with associated demographic category information (representative of the audiences to which the advertisers desire to target the advertisements) are distributed to the user television equipment (e.g., by transmission from main facility 32 and distribution via television distribution facility 38). At step 72, the program guide determines which advertisements are to be displayed for the user by comparing the demographic category information associated with the advertisements with the user's demographic category information.

The foregoing is merely illustrative of the principles of this invention and various modifications can be made by those skilled in the art without departing from the scope and spirit of the invention.

What is claimed is:

1. A method for targeting advertisements to a user of an interactive television program guide based on a user demographic category value that represents a likelihood that the user fits within a demographic category, the method comprising:

receiving advertisements suitable for display by the interactive television program guide, wherein each advertisement is associated with a demographic criteria for at least one demographic category;

receiving a user input requesting activation of a function of the interactive television program guide for a program, wherein the user input is received by a user interface of the interactive television program guide;

determining a type of function of the interactive television program guide that was requested for the program;

determining a weight associated with the determined type of function, wherein each of a plurality of interactive television program guide function types are associated with a predetermined weight value;

determining a demographic category value associated with the program;

determining a user demographic category value for at least one demographic category based on the determined demographic category value adjusted by the determined weight;

comparing the determined user demographic category value with the demographic criteria associated with the received advertisements;

selecting advertisements for display if the determined user demographic category value meets the demographic criteria; and displaying the selected advertisements in the interactive television program guide.

2. The method of claim 1 further comprising:
storing information concerning television channels necessary for determining the user demographic category value for the at least one demographic category; and
storing information concerning programs necessary for determining the user demographic category value for the at least one demographic category.

3. The method of claim 1, wherein the step of determining the user demographic category value for the at least one demographic category further comprises:
providing, for each television channel and program having a bearing on the at least one demographic category, a predetermined value indicative of how closely the user viewing the television channel or the program fits the demographic category.

4. The method of claim 1 further comprising providing default values for at least one of the demographic categories.

5. The method of claim 1, wherein the step of determining the user demographic category value for the at least one demographic category further comprises providing a period for the at least one demographic category.

6. The method of claim 1, wherein the step of determining the user demographic category value for the at least one demographic category further comprises applying a decay function to reset at least one of the user values for at least one of the demographic categories.

7. A method for targeting advertisements to a user of an interactive television program guide based on a user demographic category value that represents a likelihood that the user fits within a demographic category, the method comprising:
receiving advertisements suitable for display by the interactive television program guide, wherein each advertisement is associated with a demographic criteria for at least one demographic category;
receiving user inputs requesting activation of at least one function of the interactive program guide associated with a program, wherein the user inputs are received by a user interface of the interactive television program guide;
determining a type of function of the interactive television program guide that was requested for the program;
adjusting the user demographic category value for at least one demographic category based on the type of function requested and a demographic category value associated with the program;
determining whether a predetermined number of user inputs associated with the program were received;
setting the user demographic category value to a default user demographic category value when the predetermined number of user inputs associated with the program was not received;
comparing the user demographic category value with the demographic criteria associated with the received advertisements, whereby the comparison selects advertisements for display if the user demographic category value meets the demographic criteria; and
displaying the selected advertisements in the interactive television program guide.

8. A method for targeting advertisements to a user of an interactive television program guide based on a user demographic category value that represents a likelihood that the user fits within a demographic category, the method comprising:
receiving advertisements suitable for display by the interactive television program guide, wherein each advertisement is associated with a demographic criteria for at least one demographic category;
receiving user inputs requesting activation of a function of the interactive television program guide associated with a program, wherein the user inputs are received by a user interface of the interactive television program guide;
determining a type of function of the interactive television program guide that was requested for the program;
determining the user demographic category value for at least one demographic category by adjusting a previous user demographic category value based on the type of function requested and a demographic category value associated with the program;
adjusting the user demographic category value towards a predetermined user demographic category value at a regular interval using a decay function;
comparing the user demographic category value with the demographic criteria associated with the received advertisements, whereby the comparison selects advertisements for display if the user demographic category value meets the demographic criteria;
displaying the selected advertisements in the interactive television program guide.

9. A system in which an interactive television program guide capable of displaying targeted advertisements to a user of the guide, wherein the displayed targeted advertisements are based on a user demographic category value that represents a likelihood that the user fits within a demographic category, is implemented, the system comprising:
a display; and
a user television equipment, wherein the user television equipment is configured to:
receive advertisements suitable for display by the interactive television program guide, wherein each advertisement is associated with a demographic criteria for at least one demographic category;
receive a user input requesting activation of a function of the interactive television program guide for a program, wherein the user input is received by a user interface of the interactive television program guide;

determine a type of function of the interactive television program guide that was requested for the program;

determine a weight associated with the determined type of function, wherein each of a plurality of interactive television program guide function types are associated with a predetermined weight value;

determine a demographic category value associated with the program;

determine a user demographic category value for at least one demographic category based on the determined demographic category value adjusted by the determined weight;

compare the determined user demographic category value with the demographic criteria associated with the received advertisements;

select advertisements for display if the determined user demographic category value meets the demographic criteria; and display, on the display, the selected advertisements in the interactive television program guide.

10. The system of claim 9, wherein the user television equipment is further configured to:

store information concerning television channels necessary for determining the user demographic category value for the at least one demographic category; and store information concerning programs necessary for determining the user demographic category value for the at least one demographic category.

11. The system of claim 9, wherein the user television equipment, when configured to determine the user demographic category value for the at least one demographic category, is further configured to:

provide, for each television channel and program having a bearing on the at least one demographic category, a predetermined value indicative of how closely the user viewing the television channel or the program fits the demographic category.

12. The system of claim 9, wherein the user television equipment is further configured to provide default values for at least one of the demographic categories.

13. The system of claim 9, wherein the user television equipment, when configured to determine the user demographic category value for the at least one demographic category, is further configured to provide a period for the at least one demographic category.

14. The system of claim 9, wherein the user television equipment, when configured to determine the user demographic category value for the at least one demographic category, is further configured to apply a decay function to reset at least one of the user values for at least one of the demographic categories.

15. A system in which an interactive television program guide capable of displaying targeted advertisements to a user of the guide, wherein the displayed targeted advertisements are based on a user demographic category value that represents a likelihood that the user fits within a demographic category, is implemented, the system comprising:

a display; and a user television equipment, wherein the user television equipment is configured to:

receive advertisements suitable for display by the interactive television program guide, wherein each advertisement is associated with a demographic criteria for at least one demographic category;

receive user inputs requesting activation of a least one function of the interactive program guide associated with a program, wherein the user inputs are received by a user interface of the interactive television program guide;

determine a type of function of the interactive television program guide that was requested for the program;

adjust the user demographic category value for at least one demographic category based on the type of function requested and a demographic category value associated with the program;

determine whether a predetermined number of user inputs associated with the program was received;

set the user demographic category value to a default user demographic category value when the predetermined number of user inputs associated with the program was not received;

compare the user demographic category value with the demographic criteria associated with the received advertisements, whereby the comparison selects advertisements for display if the user demographic category value meets the demographic criteria; and display, on the display, the selected advertisements in the interactive television program guide.

16. A system in which an interactive television program guide capable of displaying targeted advertisements to a user of the guide, wherein the displayed targeted advertisements are based on a user demographic category value that represents a likelihood that the user fits within a demographic category, is implemented, the system comprising:

a display; and a user television equipment, wherein the user television equipment is configured to:

receive advertisements suitable for display by the interactive television program guide, wherein each advertisement is associated with a demographic criteria for at least one demographic category;

receive user inputs requesting activation of a function of the interactive television program guide associated with a program, wherein the user inputs are received by a user interface of the interactive television program guide;

determine a type of function of the interactive television program guide that was requested for the program;

determine the user demographic category value for at least one demographic category by adjusting a previous user demographic category value based on the type of function requested and a demographic category value associated with the program;

adjust the user demographic category value towards a predetermined user demographic category value at a regular interval using a decay function;

compare the user demographic category value with the demographic criteria associated with the received advertisements, whereby the comparison selects advertisements for display if the user demographic category value meets the demographic criteria;

display, on the display, the selected advertisements in the interactive television program guide.

17. The method of claim 1, wherein the user activated function of the interactive television program guide relates to recording a program, tuning to a program, retrieving information about a program, or setting a reminder for a program.

18. The method of claim 7, wherein the user activated function of the interactive television program guide relates to recording a program, tuning to a program, retrieving information about a program, or setting a reminder for a program.

19. The method of claim 8, wherein the user activated function of the interactive television program guide relates to recording a program, tuning to a program, retrieving information about a program, or setting a reminder for a program.

20. The system of claim 9, wherein the user activated function of the interactive television program guide relates to recording a program, tuning to a program, retrieving information about a program, or setting a reminder for a program.

21. The system of claim 15, wherein the user activated function of the interactive television program guide relates to recording a program, tuning to a program, retrieving information about a program, or setting a reminder for a program.

22. The system of claim 16, wherein the user activated function of the interactive television program guide relates to recording a program, tuning to a program, retrieving information about a program, or setting a reminder for a program.

* * * * *

UNITED STATES PATENT AND TRADEMARK OFFICE
CERTIFICATE OF CORRECTION

PATENT NO. : 7,634,786 B2  
APPLICATION NO. : 10/923263  
DATED : December 15, 2009  
INVENTOR(S) : Knee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Ninth Day of November, 2010

David J. Kappos  
*Director of the United States Patent and Trademark Office*